United States

Ernstoff et al.

[11] 4,006,968
[45] Feb. 8, 1977

[54] LIQUID CRYSTAL DOT COLOR DISPLAY

[75] Inventors: Michael N. Ernstoff, Los Angeles; William C. Hoffman, Torrance; Richard N. Winner, Palos Verdes Peninsula, all of Calif.

[73] Assignee: Hughes Aircraft Company, Culver City, Calif.

[22] Filed: May 2, 1975

[21] Appl. No.: 574,150

[52] U.S. Cl. .................. 350/160 LC; 350/166; 358/56; 358/59
[51] Int. Cl. ........................................ G02F 1/13
[58] Field of Search ........... 350/160 LC, 164, 166; 358/56, 59

[56] References Cited
UNITED STATES PATENTS 3,840,695   10/1974   Fischer ............. 350/160 LC X Primary Examiner—Edward S. Bauer
Attorney, Agent, or Firm—Paul H. Ware; W. H. MacAllister

[57] ABSTRACT

A solid state dot sequential color display device is disclosed. A color image is formed in a liquid crystal display panel by breaking each picture element up into its three primary color components and presenting them in an adjacent manner. The space occupied by a trio of primary color elements is smaller than the resolving power of the human eye. Techniques of large scale integration (LSI) are employed to effect the required addressing circuitry as applied to a matrix array of triads of reflective electrodes in the dynamic scattering liquid crystal display panel. Arrangements used to form the basic color cells involved are: (a) deposition of band-pass filters in front of the display and (b) deposition of band reflection mirror in back of the liquid crystal material.

5 Claims, 12 Drawing Figures

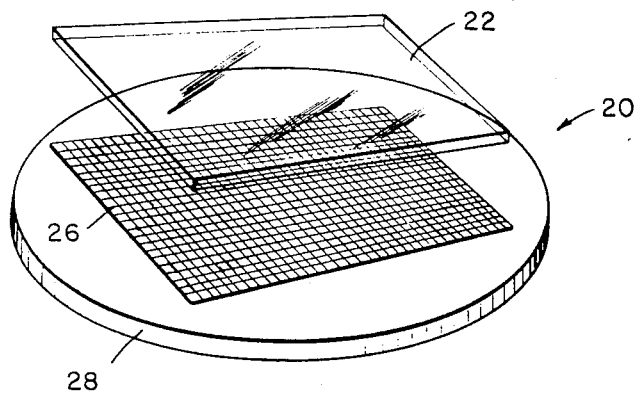
Fig. 2.
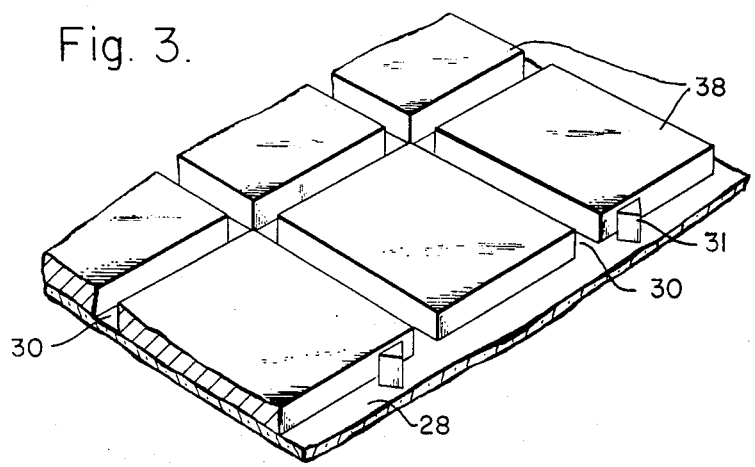
Fig. 3.
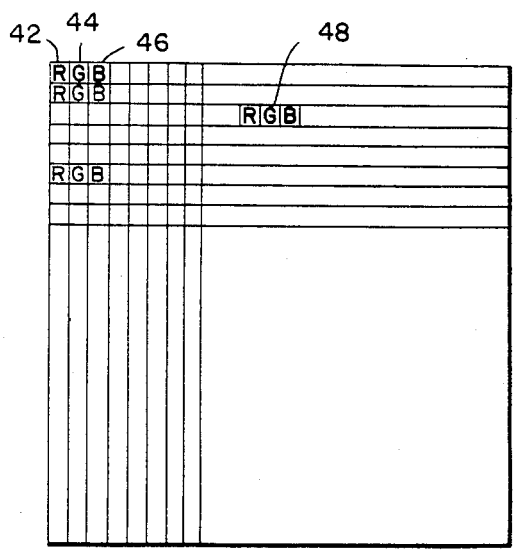
Fig. 4.
Fig. 4a.

LIQUID CRYSTAL DOT COLOR DISPLAY

CROSS REFERENCES TO RELATED APPLICATIONS

A fabrication scheme using the methodology of large scale integration techniques is described in Ser. No. 352,397, filed Apr. 18, 1973. A matrix array of reflective electrodes, as well as the individual addressing circuitry and electrical storage circuitry for each liquid crystal cell of a flat panel liquid crystal display are formed on semiconductor back plates. Each reflective electrode forms one element or plate of a storage capacitor for a corresponding liquid crystal cell.

BACKGROUND OF THE INVENTION

1. Field of the Invention

This invention relates to liquid crystal display systems and particularly to such systems that form a full color image through an adjacent dot process.

2. Description of the Prior Art

The term liquid crystal is applied to substances whose rheological behavior is similar to that of fluids but whose optical properties are similar to the crystalline state. This mesomorphic behavior is fairly common in organic compounds. Both aliphatic and aromatic compounds can exist as liquid crystals.

There are three basic types of liquid crystal material. These are termed nematic, smectic and cholesteric. Nematic liquid crystals consist of rod-like organic molecules. These molecules can move in the direction of their long axis and from side to side but their many other mechanically possible motions are constrained by the forces between them. They maintain a parallel, or nearly parallel arrangement, although each molecule can rotate about its axis of length symmetry. The word nematic comes from the Greek work meaning thread. When a nematic liquid crystal material is viewed under a microscope, one sees tiny thread-like formations. Each molecule in the nematic liquid crystal material is constrained to maintain its longitudinal orientation with respect to the other molecules in its domain, however, it is free to rotate about its longitudinal axis. Nematic liquid crystal molecules are also free to move from side to side or in a lengthwise direction. Such a packing arrangement has been likened to the orientation of wooden matches in a match box; the matches can move but tend to remain in parallel relationship with respect to each other.

Smectic liquid crystal molecules array themselves in layers. Any two layers can slide each over the other because the molecules cannot move in the direction of their long axis but only foward and backward or side to side in layers. Like nematic molecules, smectic molecules can rotate freely about their direction of length alignment. The word smectic is derived from the Greek work for soap. Smectic molecules are arranged in layers that can slide over each other however the molecules cannot move from layer to layer. The smectic liquid crystal materials incorporate the contraints of the nematic liquid crystal materials and are burdened with the further constraint of being incapable of migrating from layer-to-layer.

Cholesteric liquid crystals bear some resemblance to both smectic and nematic liquid crystals. These molecules are smectic in that they are arranged in layers, however, the molecular pattern itself is nematic.

These substances and their properties have been further examined by Heilmeir et al in Proceedings of IEEE vol. 56, No. 7, July, 1968 pages 1162-1171 in a paper entitled DYNAMIC SCATTERING: A NEW ELECTRO-OPTIC EFFECT IN CERTAIN CLASSES OF NEMATIC LIQUID CRYSTALS. In another paper also authored by Heilmeir entitled LIQUID CRYSTAL DISPLAY DEVICES In Scientific American vol. 222, April, 1970 starting at page 102:

"A molecule has an electric dipole moment simply because it is an electric dipole, that is, it can be described as an object having two electric charges separated by a distance. In the case of a molecule one end tends to be positively charged and the other tends to be negatively charged because of the asymmetrical distribution of the electrons that bind the atoms in the molecule. In ordinary liquids the electric forces are not strong enough to keep the molecules aligned because of the molecules' natural tendency to move randomly and independently. As a result perhaps only one in a thousand molecules would be aligned by an electric field.

As an electric field is imposing order on a liquid crystal it can also set in motion a chain of events that disrupts the molecular pattern forming under its influence. Nematic solutions contain ionic impurities (positively or negatively charged molecular fragments that are not from the nematic compound) and other ions that are probably produced by dissociation of the nematic compound itself. The electric field pulls the ions towards one or the other of its poles. In a nematic substance such as PEBAB the dipole moment of a molecule lies along its structural axis, and in an electric field the axis of the molecules of the substance line up parallel to one another. Ions can pass through an array without creating large disturbances. The term PEBAB refers to the nematic liquid crystal p-ethoxy-benzylidene-p-aminobenzonitrile.

Suppose, however, that the permanent dipole moment does not lie along the structural axis of the molecules. Such a molecule is by no means rare, because many molecules have side chains of atoms attached to their main chain. The electric dipole moment is along these branches rather than along the "backbone" of the molecule.

One substance of this kind is the nematic liquid crystal anisylidene-p-aminophenylacetate (APAPA). When this substance is subjected to an electric field, its molecules line up not along their main chain but perpendicularly to it because of the strong influence of the side chains. The main chains are therefore oriented in various directions with respect to the electric field. Aligned in this way the molecules present a barrier to the moving ions. The ions push through the log jam and disrupt the array, creating comparatively large regions of turbulence (from one micron to five microns across). The turbulence causes the thin layer of nematic material, which was originally transparent, to become milky white because the turbulent fluid scatters light. This effect is called dynamic scattering. Dynamic scattering can be halted and the clarity of the liquid crystal restored simply by turning off the voltage.

Prior art three-color color display devices have utilized a shadow-mask color cathode ray tube. These devices have characteristically required a comparatively great amount of space. Power dissipation in prior art devices has been high and the voltage demands of such systems have been of the order of many kilovolts.

It would be of great benefit to the art to provide a full color flat panel liquid crystal display device which would dissipate much less power than the shadow-mask color cathode ray tube. It would also be of great benefit to the art to provide a display device which would operate on a much lower voltage level than the shadow-mask color cathode ray tube and be usable in the same applications. It would also be of great benefit to provide a replacement for the shadow-mask color cathode ray tube that would permit the fabrication of far more compact and rugged color television displays.

SUMMARY OF THE INVENTION

A liquid crystal dot sequential color display device according to the present invention may be fabricated by sandwiching a thin layer of liquid crystal material between a transparent cover plate having an electrode structure formed on one of its surfaces and a second electrode structure formed on a semiconductor wafer. Any of the liquid crystal materials heretofore described may be employed for the purposes of the present invention, however, a nematic liquid crystal material was, in fact, utilized in prototype display panels constructed according to the invention. Proper insulating spacers providing electrical insulation and physical spacing between electrode structures may be provided as well as a seal providing retention of the liquid crystal material between the transparent cover plate and the semiconductor wafer. It is usual to provide the second electrode structure as a matrix array of liquid crystal cells along with addressing circuitry so that each cell may be addressed individually.

It is thus an object of the present invention to provide a full color flat panel liquid crystal display device representing a potential replacement for the shadow-mask color cathode ray tube.

It is a further object of this invention to provide a more rugged display system comprising solid state elements.

It is also an object of this invention to provide a potential replacement for the shadow-mask color cathode ray tube operable at a comparatively much lower level of power and voltage.

Additional objects, advantages and characteristic features of the present invention will become readily apparent from the following detailed description of preferred embodiments of the invention when considered in conjunction with the accompanying drawings.

BRIEF DESCRIPTION OF THE DRAWINGS

FIG. 2 is an exploded perspective view of an assembled panel in accordance with the invention.

FIG. 3 is an enlargement of a portion of FIG. 2 showing details of a liquid crystal cell matrix array structure.

FIG. 4 is a schematic diagram illustrating a method of forming typical elemental liquid crystal color cell triads.

FIG. 4a is a schematic diagram illustrating an alternative arrangement of elemental liquid crystal color cell triads.

Figure 6A:
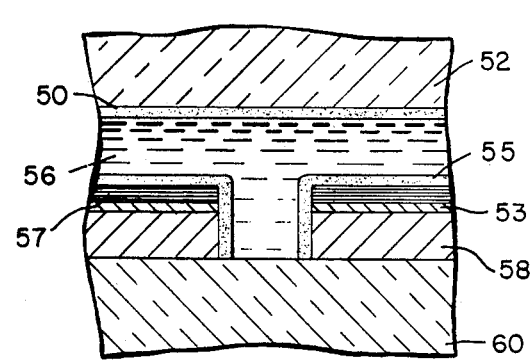
FIG. 6 is a cross sectional view of another method of assembling a liquid crystal cell in accordance with the invention.
Figure 6:
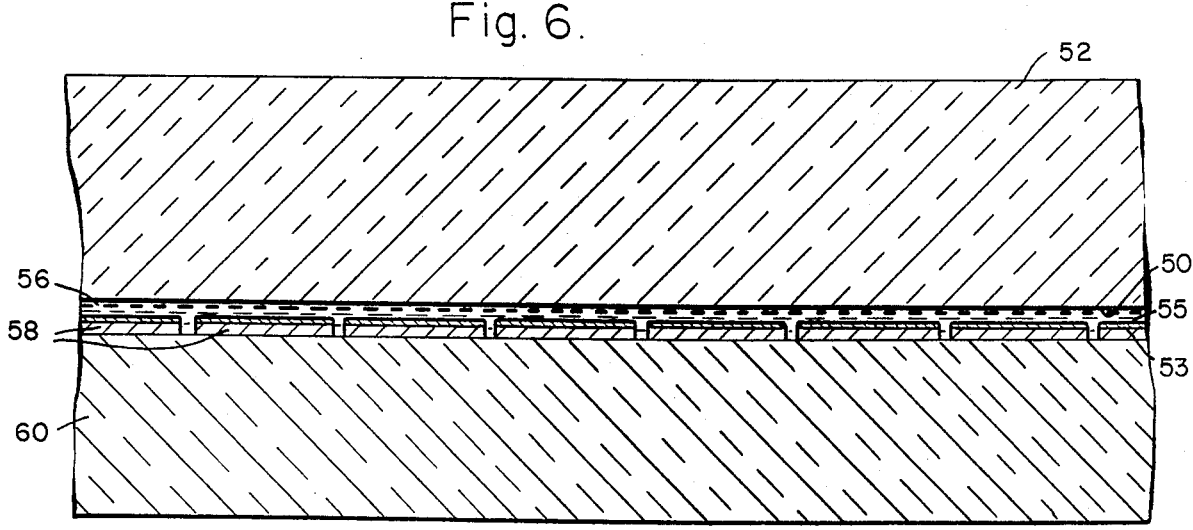

6a is an enlargement of FIG. 6 showing additional details for clarity.

Figure 7:
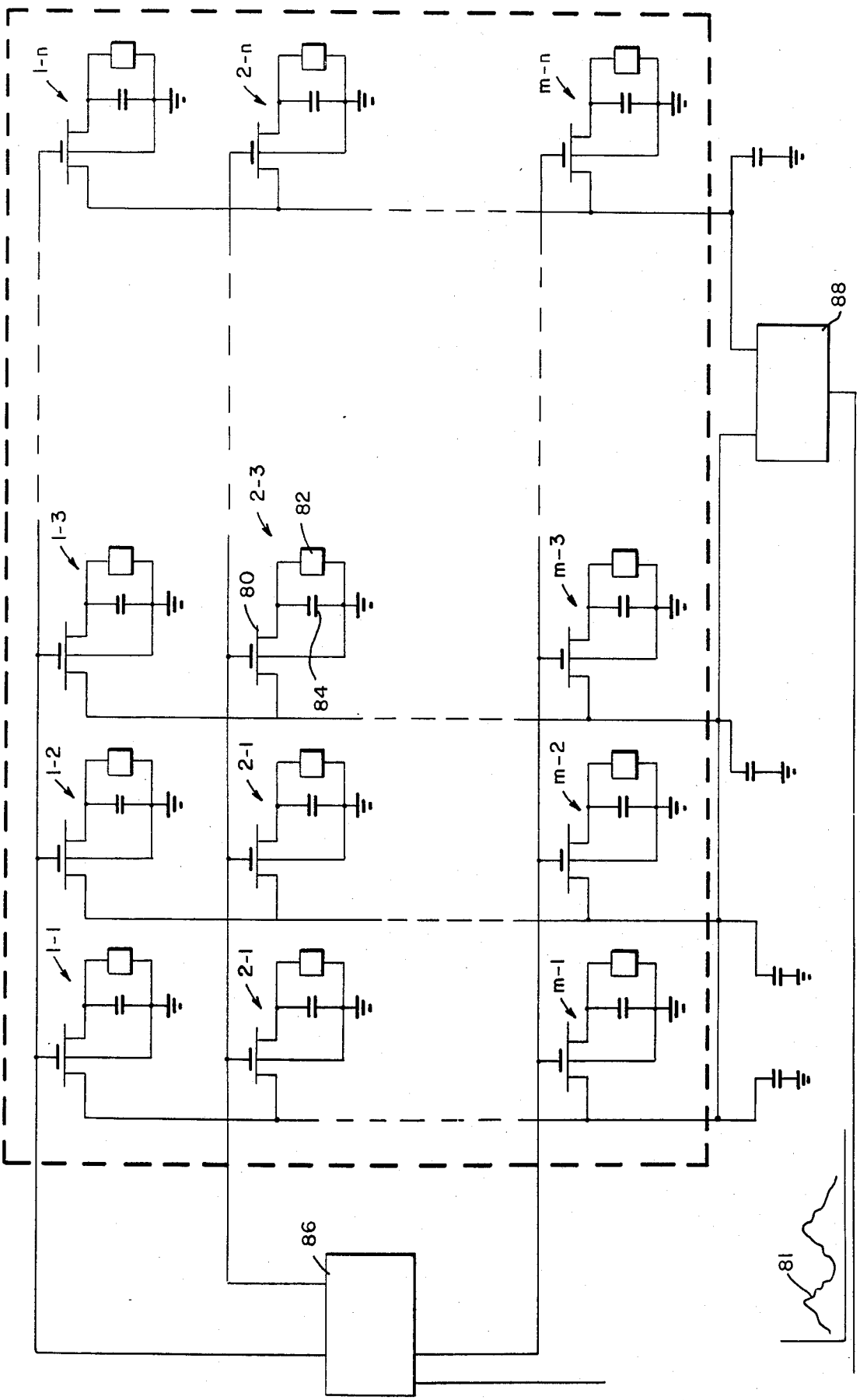

FIG. 7 is a schematic diagram illustrating a multiplex addressing scheme such as might be used with the invention.

DESCRIPTION OF THE PREFERRED EMBODIMENTS

Figure 1A:
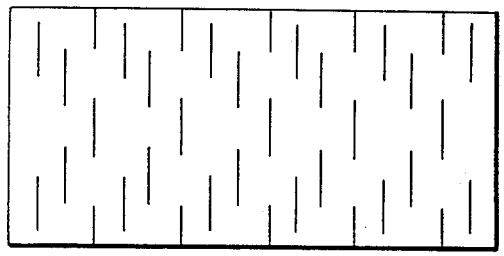
FIG. 1a is an idealized schematic drawing showing the arrangements of the molecules in a nematic liquid crystal material.
Figure 1B:
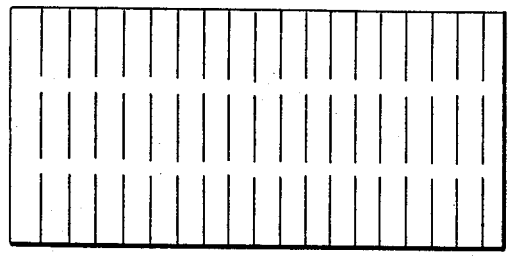
FIG. 1B is an idealized schematic drawing showing the arrangement of the molecules in a smectic liquid crystal material.
Figure 1C:
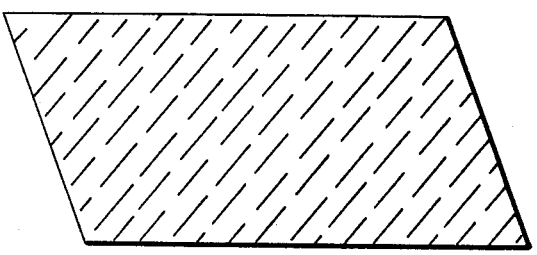
FIG. 1c is a schematic drawing showing the arrangements of the molecules in a cholesteric liquid crystal material.
Figure 1C:
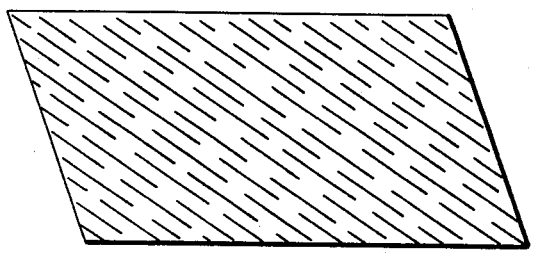
Figure 1C:
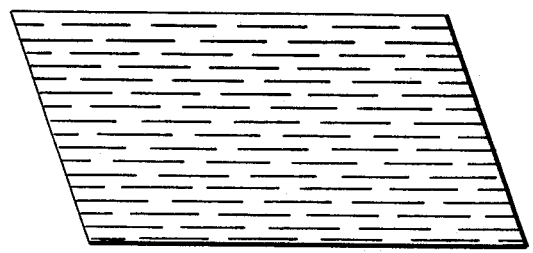

Referring to FIGS. 1a, 1b and 1c, the differences between the three types of liquid crystal material may be understood. FIG. 1a illustrates molecular arrangement in a nematic type liquid crystal material.

FIG. 1b illustrates molecular orientation in a domain of a smectic type liquid crystal material.

FIG. 1c illustrates molecular orientation in a cholesteric type liquid crystal material. It may be noted that this material bears some resemblance to both nematic and smectic liquid crystal materials. Cholesteric materials are smectic in that the arrangements of the molecules are layered, however, within each layer, the arrangements are nematic.

Referring now to FIGS. 2 and 3 a modular construction of a dot sequential liquid crystal display device is illustrated. The device, noted generally at 20 includes a front transparent cover 22. A matrix array of electrode structures 26 is formed on a semiconductor wafer 28. Individual electrodes formed on semiconductor wafer 28 are denoted 38 in FIG. 3. Suitable liquid crystal material fills the interstices 30 between electrodes 38. When front transparent cover 22 having a transparent electrode on its undersurface is positioned upon matrix array 26, insulating spacers, 31, provide a thin liquid crystal film between electrodes 38 and the transparent electrode on the underside of front transparent cover 22. A typical color triad would thus be formed as shown in FIG. 4 at 48.

Attention is now directed to FIG. 4. Three sets of elemental cells are required for each color display device. Each set is fabricated so that light reflected therefrom will be one of the three primary colors, that is, red, green or blue. Cells belonging to the same set are arranged, for example, in columns 42 red, 44 green, and 46 blue as shown. The display elements may thus be addressed a row at a time. If the elements were intended to be addressed a column at a time, then cells of the same set could be arranged in rows. A typical elemental color triad much larger than actual is illustrated at 48. The dimensions of the triad are in reality smaller than the resolving power of the human eye. As shown in FIG. 4, the display device will have unequal vertical and horizontal resolution. Such a display may or may not exhibit an inherent disadvantage because of this unequal resolution. Equal resolution in both horizontal and vertical directions may be obtained by an arrangement of cells as illustrated in FIG. 4 (a). In forming the matrix of which the display device is made up, it is necessary that each elemental triad be smaller than the resolving power of the human eye. The display device as illustrated in FIG. 4a will be amenable to any type of sweep employed in developing the full color display.

The structure and operation of a matrix array of such cells forming a dot sequential color display device may be further examined by reference to FIGS. 5, 5a, 6 and 6a. As there shown, a liquid crystal display panel may be formed by sandwiching a thin layer of liquid crystal material 56 between a transparent plate 52 which has a transparent electrode 50 covering one surface, and a backplate 60 which has a matrix array of reflective electrodes 58 formed thereon. LSI semiconductor technology makes it feasible to fabricate very high density circuitry and thus permits high density color triads. Liquid crystal material fills the interstices formed as shown at 30 of FIG. 3 between the front transparent cover 52 of FIG. 5 of the order of one-tenth of an inch to one-fourth of an inch thick and the backplate 60 of the order of 0.012 of an inch thick such that the liquid crystal material in the assembled panel may be of the order of five ten-thousandths of an inch thick. The edges of the panel may be sealed by a suitable means.

Interference filters as used in the present invention are of two types, transmission and reflection. Transmission type interference filters can be made for any wavelength desired. They usually consist of one or several thin layers of a transparent material enclosed between semi-transparent coatings. These layers are successively deposited on a glass plate in a high vacuum environment and then a cover plate is cemented to it for protection. The separation of the coatings, usually half a wavelength or a multiple thereof, determines the color of the light which the filter will transmit.

Figure 5:
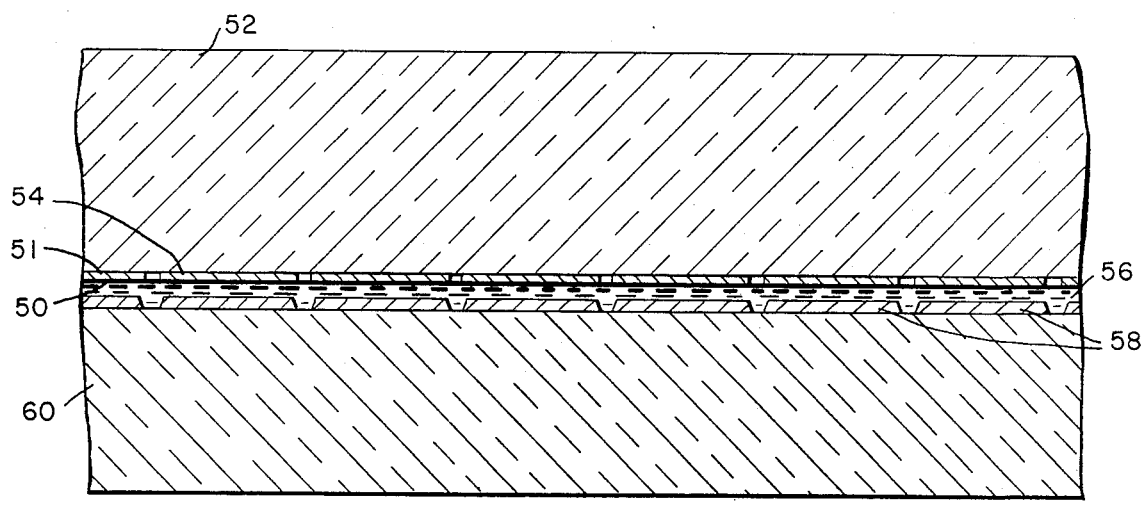
FIG. 5 is a cross sectional view of a method of assembling a liquid crystal cell in accordance with the invention.

Referring now to FIG. 5, fabrication of a liquid crystal display device utilizing a band-pass transmission type filter will be explained. A method showing deposition of transmission filters is available from Optical Coating Laboratories (OCLI), Santa Rosa, Cal., under Part No. 6028002.

Figure 5A:
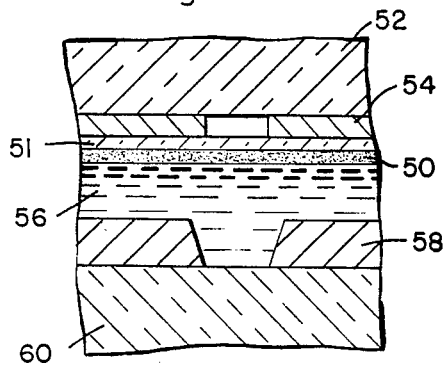
FIG. 5a is an enlargement of a portion of FIG. 5 showing additional details for clarity.

Such a filter matrix might be built by depositing an electrode matrix structure as indicated at 58 in FIG. 5 upon a bulk silicon substrate indicated at 60. The bulk silicon substrate as used in the invention has the dimensions of thickness of about twelve-thousandths of an inch. A void of about five ten-thousandths of an inch may be provided by the electrode structure and suitable spacers. This void is created to contain the liquid crystal film. Reference to FIG. 5a illustrates relative positions of the elements of the display device with greater clarity. There is shown the elemental electrode structure 58 as deposited on the bulk silicon substrate 60. The liquid crystal film indicated at 56 is directly above this construction. A thin glass cover plate indicated at 51 directly above the liquid crystal film 56 is the surface upon which band-pass filters 54 are deposited. Each band-pass filter layer is approximately "d" thick where:

$$d = \frac{\lambda_o}{2} \frac{\epsilon_o}{\epsilon_r}$$

where
$\lambda_o$ = Wavelength of the color of light to be transmitted.
$\epsilon_o$ = Index of refraction of free space
$\epsilon_r$ = Index of refraction of filter material After the band-pass filters 54 have been deposited, the thin glass plate 51 coated with a transparent conductor such as indium oxide indicated as 50 is glued using an optical cement to the color filter. The glass cover plate 52 between 1/10 and ¼ inch thick is then positioned as a protective outer surface.

The filters 54 are deposited in the appropriate places using standard photographic masking techniques. First a mask is made for where the red filter is desired. The plate is then coated with photoresist and exposed during the mask. This mask is then developed so as to open up the area where the red filter is to be deposited. The sequence of depositions necessary to form the red filter is then preformed, the old photoresist is removed and new photoresist deposited and exposed with the mask for the green filters. The process is then again repeated for the blue filters.

The proper filter pattern may be formed in a transparent plastic film such as by exposing EKTACHROME photographic film to art work of the appropriate size and color. This plastic film is then sandwiched between two pieces of glass, one to provide physical rigidity and one upon which has been previously deposited the required transparent conductive coating 50.

FIG. 6 illustrates another method which may be implemented for making a display panel according to the invention. By making alternating layers of the order of one-fourth of a wavelength thick, one can build a wavelength sensitive reflector. These band-reflection filters are often termed dichroic mirrors. The thicknesses are not precisely one-fourth of a wavelength because reflection over a band of wavelengths is desired. The filters are deposited a color at a time, using photoresist masks as in the previous method, however, there are some basic differences. FIG. 6a illustrates the detailed build-up of the elements in this alternate method. After formation of the electrode structure 58 on the bulk silicon substrate 60 a light absorber 53 such as silveroxide is then deposited. Selective quarter wavelength dichroic reflectors 57 are then deposited on this absorber material after which a transparent electrode, for example an indium oxide coating 55 is applied over all. It is now necessary to create a void to receive the liquid crystal material 56 by means of spacers not shown. The protective glass plate 52, undercoated with a transparent conductor material 50, is applied in order to prevent injury to the display device.

Referring again to FIG. 5 and more particularly to FIG. 5a, the operation of elemental cells in accordance with the invention will be explained. In the unenergized state, that is, with no applied potential difference between the electrode 58 and the transparent conductor 50, there is no electric field affecting the liquid crystal material 56 therebetween. Thus under these conditions, there are no turbulences created in the liquid crystal material in the elemental cell under consideration. Upon the application of a potential difference between electrode 58 and transparent conductor 50, an electric field will be active therebetween and will set up a region of turbulence in the liquid crystal material of the elemental cell thus formed thereby exciting the cell. A liquid crystal material, when in an unexcited state, is relatively transparent to light, thus light entering an unexcited liquid crystal cell will be partially absorbed in passing through front transparent cover plate 52, deposited filters 54, thin transparent cover plate 51, transparent electrode 50, and unexcited liquid crystal material 56. Transmitted light thus incident upon reflective electrodes 58 will be reflected therefrom to be further absorbed by passing again through the enumerated structural elements. An observer, viewing a liquid crystal display panel constructed in accordance with an embodiment of the invention as exemplified in FIGS. 5 and 5a will thus perceive a dull, mirror-like effect when none of the liquid crystal cells is excited.

If now, in a representative liquid crystal cell, an appropriate potential difference is applied between reflective electrode 58 and transparent electrode 50, a turbulence is created therebetween in the liquid crystal material 56 as explained above. The turbulence thus created in the liquid crystal material 56 in the region of reflective electrode 58 causes this liquid crystal material to scatter incident light. Thus the excited elemental cell appears to light up, the light perceived by a viewer now being the color of the filter adjacent the excited cell of liquid crystal material. An observer, viewing a liquid crystal display panel of this type under conditions of excitation of some of its elemental cells will thus perceive pinpoints of colored light, the color perceived in each pinpoint of light being determined by the color of the deposited filter 54 associated with each excited elemental cell. Due to the small ratio of liquid crystal film thickness to elemental electrode size, scattering from each elemental cell so formed will be confined to the area directly adjacent the exciting elemental electrode.

Referring now to FIG. 6 and more particularly to FIG. 6a, the operation of elemental cells in accordance with an alternative embodiment of the invention will be explained. In the unenergized state, that is, with no applied potential difference between the electrode structure comprising primary electrode 58 and transparent electrode 55 and the transparent electrode 50, there will be no electric field affecting the liquid crystal material 56 therebetween. Thus under these conditions, there are no turbulences created in the liquid crystal material in the elemental cell under consideration. Incident light will be partially absorbed in passing through front transparent cover plate 52, transparent electrode 50, unexcited liquid crystal material 56, transparent electrodes 55 and selective quarter wavelength dichroic reflectors 57. Remaining incident light will be strongly absorbed by light absorber 53. An observer, viewing a liquid crystal display panel constructed in accordance with an embodiment of the invention as exemplified by FIGS. 6 and 6a will thus preceive a dull, dark-surface effect when none of the liquid crystal cells is excited.

If now, in a representative elemental liquid crystal cell, an appropriate potential difference is applied between the electrode structure comprising primary electrode 58 and transparent electrode 55 and the transparent electrode 50, an electric field will be active therebetween and will set up a region of turbulence in the liquid crystal material of the representative elemental liquid crystal cell. The excited elemental cell appears to light up, however, the light perceived by an observer while viewing a display panel constructed according to this latter embodiment of the invention has the color that is selectively reflected by the selective quarter wavelength dichroic reflectors 57. An observer viewing a liquid crystal display panel of this type under conditions of excitation of some of its elemental cells will thus perceive pinpoints of colored light, the color perceived in each pinpoint being determined by the color selectively reflected by the quarter wavelength dichroic reflector 57 associated with each excited elemental cell. Again, due to the small ratio of liquid crystal film thickness to elemental electrode size, scattering from each elemental cell so formed will be confined to the area directly adjacent the exciting elemental electrode.

Referring now to FIG. 7 the schematic diagram of a possible addressing circuit that may be used with the present invention is shown. A typical elemental field effect transistor is denoted at 80 with a typical elemental liquid crystal cell denoted at 82 and a typical elemental video storage capacitor denoted at 84. These elements comprise an m-by-n matrix comprising the three basic elements of transistor, liquid crystal cell and storage capacitor. By an m-by-n matrix is meant a matrix with m rows and n columns.

Vertical sweep multiplexer 86 can energize the gates of all field effect transistors in any row. Video sampling multiplexer 88 may now apply a video signal 81 to any matrix element. Thus video information can be written into all the matrix elements, that is, matrix elements 1—1 through matrix elements m-n.

There have thus been shown means for the fabrication and operation of a liquid crystal dot sequential color display. Such a liquid crystal display device represents a potential replacemement for the shadow-mask color cathode ray tube and further provides a color display on which contrast can be maintained at high levels of ambient illumination. Although the invention has been shown and described with reference to particular embodiments nevertheless various changes and modifications obvious to a person skilled in the art to which the invention pertains are deemed to lie within the purview of the invention.

What is claimed is:

1. A display system comprising in combination:
   a first electrode structure formed on one surface of a flat bulk silicon substrate wafer;
   a thin transparent plate, one side of which covers said first electrode structure;
   a second electrode structure formed on said one side of the thin transparent plate;
   a plurality of color selective interference filters deposited on another side of said thin transparent plate forming columnar strips selective of different adjacent colors;
   an insulating structure providing electrical insulation between said first electrode structure and said second electrode structure and creating interstices therebetween;
   liquid crystal material positioned between said first electrode structure and said second electrode structure so as to fill said interstices created by said insulating structure;
   arrangement of said interstices positioned with said columnar strips to form color triads therefrom;
   a transparent cover plate positioned to protect said display system and retain said liquid crystal material between the first and second electrode structures; and
   means coupled to said first and second electrode structures for applying electric current thereto, thereby creating electric fields in selected ones of said interstices.

2. The combination of claim 1 wherein said plurality of color selective interference filters selects colors between the primary colors red, green and blue.

3. The combination of claim 1 wherein said color triads are formed from primary colors red, green and blue.

4. A display system comprising a combination:
- a first electrode structure formed on one surface of a flat bulk silicon substrate wafer;
- light absorbing means deposited on said first electrode structure;
- selective reflector means deposited on said light absorbing means;
- a transparent coverplate, one side of which covers said selective reflector means;
- a second electrode structure formed on said one side of said transparent coverplate;
- an insulating structure providing electrical insulation between said first electrode structure and said second electrode structure and providing a spatial void therebetween;
- liquid crystal material situate between said first electrode structure and said second electrode structure so as to fill said spatial void;
- means for applying electric current to said first and second electrode structures thereby creating electric fields in selected ones of said interstices.

5. The combination of claim 4 wherein said selective reflector means selects color reflections between the primary colors red, green and blue.

* * * * *